(12) United States Patent
Egan

(10) Patent No.: US 6,694,670 B1
(45) Date of Patent: *Feb. 24, 2004

(54) TRANSPORTABLE TURF GRASSES AND GRASS SPORTS SURFACES HAVING POROUS FOUNDATIONS

(76) Inventor: Michael A. Egan, 105 E. 65th St., Savannah, GA (US) 31405

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,894

(22) Filed: Mar. 12, 1997

Related U.S. Application Data

(62) Division of application No. 08/509,172, filed on Jul. 31, 1995, now Pat. No. 5,651,213, which is a continuation-in-part of application No. 08/225,818, filed on Apr. 11, 1994, now abandoned, which is a division of application No. 07/926,663, filed on Aug. 7, 1992, now Pat. No. 5,301,466.

(51) Int. Cl.[7] .............................................. A01C 1/04
(52) U.S. Cl. ........................................................ 47/56
(58) Field of Search ............................................. 47/56

(56) References Cited

U.S. PATENT DOCUMENTS

| | | | |
|---|---|---|---|
| 3,890,739 A | 6/1975 | Blackburn | 47/56 |
| 3,890,910 A | 6/1975 | Angruner | 111/1 |
| 4,023,506 A | 5/1977 | Robey | 111/1 |
| 4,099,345 A | 7/1978 | Loads | 47/56 |
| 4,232,481 A | 11/1980 | Chamoulaud | 47/56 |
| 4,336,668 A | 6/1982 | Decker | 47/58 |
| 4,364,197 A | 12/1982 | Baron | 47/56 |
| 4,720,935 A | 1/1988 | Rogers et al. | 47/56 |
| 4,941,282 A | 7/1990 | Milstein | 47/58 |
| 4,986,026 A | 1/1991 | Decker | 47/56 |
| 5,033,231 A | 7/1991 | Sakate et al. | 47/56 |
| 5,177,898 A | 1/1993 | Decker | 47/56 |
| 5,189,833 A | 3/1993 | Clark | 47/56 |
| 5,199,215 A | 4/1993 | Lopez | 47/56 |
| 5,205,068 A | 4/1993 | Solomou | 47/56 |
| 5,224,290 A | 7/1993 | Molnar et al. | 47/56 |
| 5,226,255 A | 7/1993 | Robertson | 47/56 |
| 5,301,466 A * | 4/1994 | Egan | 47/56 X |
| 5,617,671 A * | 4/1997 | Rogers et al. | 47/1.01 F |
| 5,651,213 A * | 7/1997 | Egan | 47/56 |
| 6,032,410 A * | 3/2000 | Kumar | 47/56 |
| 6,247,267 B1 * | 6/2001 | Motz et al. | 428/17 |
| 6,334,275 B1 * | 1/2002 | Egan | 47/56 |
| 6,336,291 B1 * | 1/2002 | Skuba | 47/56 |
| 6,357,176 B2 * | 3/2002 | Baldwin et al. | 47/56 |

FOREIGN PATENT DOCUMENTS

| | | | | |
|---|---|---|---|---|
| DE | 003721812 A1 * | 2/1989 | | |
| FR | 2623054 | 5/1989 | | |
| GB | 2 138 690 A | 10/1984 | | A63C/19/00 |
| JP | 360047121 A * | 3/1985 | | |

OTHER PUBLICATIONS

Anonymous, Polypropylene, An A–Z reference, 1999, Kluwer Academic Publishers, pp. 277–283.*

(List continued on next page.)

*Primary Examiner*—Peter M. Poon
*Assistant Examiner*—Jeffrey L. Gellner
(74) *Attorney, Agent, or Firm*—McAndrews, Held & Malloy, Ltd.

(57) ABSTRACT

The present invention relates to the production of sod utilizing a porous foundation, such as a geotextile. The present invention is also directed to a method for the production of sod using a soil-less sand based root zone medium and a sod mat produced by the method of the present invention.

24 Claims, 2 Drawing Sheets

OTHER PUBLICATIONS

Beard, "Turf Management for Golf Courses," Macmillan Publishing Company, New York, pp. 104–115, 131, 172–173 (1982).

Beard, "Turfgrass Science and Culture," Regents/Prentice Hall, Englewood Cliffs, New Jersey 07632, pp. 325–330, 349–352, 357–358, 523–529 (1973).

*Soil The 1957 Yearbook of Agriculture*, United States Department of Agriculture, pp. 766–767.

*Soils*, Norman Taylor, The Encyclopedia of Gardening, 1961, pp. 1121–1122.

\* cited by examiner

TRANSPORTABLE TURF GRASSES AND GRASS SPORTS SURFACES HAVING POROUS FOUNDATIONS

This application is a division of Ser. No. 08/509,172 filed Jul. 31, 1995 now U.S. Pat. No. 5,651,213, which is a division of Ser. No. 07/926,663, filed Aug. 7, 1992, now U.S. Pat. No. 5,301,466.

FIELD OF THE INVENTION

This invention relates to a method of producing turf grass in sod form. The invention is also directed to a composition for the use in the production of turf grass sod which is particularly well suited for use on sports surfaces such as stadium fields and golf courses. The invention also relates to a sod mat produced by the method of the present invention. The invention further relates to a method of producing a transportable turf utilizing a porous foundation, such as a geotextile, to provide stability to the transportable turf. The invention additionally relates to a transportable turf which includes a stabilizing porous foundation such as a geotextile.

BACKGROUND OF THE INVENTION

The success of a sports turf grass sod (a mat of grass plants grown in surface soil and sliced horizontally into a thin layer for use in a place other than where grown) depends on the proper physical characteristics of the root zone medium (the medium in which the sod is initially grown) and the compatibility of that medium to the drainage bed and the root zone profiles (the area into which the root system of the sod will grow) underlying the sports field surface where the sod will be transplanted. Native topsoils used in sod production generally do not have the physical characteristics which make them compatible with the drainage beds and root zone profiles at the site of transplanting. Therefore, in most cases root zone medium must be provided to improve the compatibility of sod growing medium and the existing root zone profile. Typically, root zone medium is compounded from available sand, soil and fibrous organic amendments such as wood fiber. Because of extreme local variations in these materials, a high degree of expertise is necessary to determine which root zone medium blends contain the desired properties. Different lots of sand from the same pit may vary considerably in particle size and shape. Native soils used in these blends also vary greatly in particle size and shape, as well as in degree of aggregation, acidity, fertility, soluble salt, and organic matter content. Another variable in typical root zone medium blend is the fibrous organic amendment.

It has long been the desire of sports fields managers and golf course superintendents to have a source of sod in which the growth medium (root zone medium) matches or nearly matches and is thus compatible with the existing root zone profiles of the areas to be planted with sod.

Because of heavy compaction resulting from high traffic on sports fields and golf greens, sand is used extensively in root zone medium mixes. The proportion of sand to other materials in the mix will vary depending on what other amendments are to be used, the water percolation rate desired, and the ultimate use of the playing surface. Under most circumstances, if conventional sod is used on these playing surfaces, layering occurs. Layering refers to the formation of an interface between the fine soil particles of the root zone medium of the sod and the more coarse sand particles of the root zone profile of the transplant site. The layer formed by this process causes water flow to be interrupted when passing through the sod, into the root zone of the transplant site and the soil. As consistent percolation rates are very important in the maintenance of these surfaces and to the establishment of a suitable root system, great differences in particle size between the root zone medium of the sod and the root zone of the transplantation site which causes layering is obviously a great disadvantage.

The United States Golf Association (USGA) green section has established guidelines for sand particle sizes which, when used in golf greens, give the most consistent percolation rates, resist compaction by players and offer a good root zone environment for grass plants. These guidelines often work extremely well for other sports field applications but are occasionally modified to meet specific needs.

In U.S. Pat. No. 4,232,481, entitled "Carpet of Vegetable Matter," by Michel C. Chamoulaud, the production of sod or other vegetable matter is described. That patent teaches a compost layer made from wood bark which is crushed and gauged and spread onto a flat surface impermeable to plant roots. The compost mix is mixed with seeds before, during or after the application to the flat surface. The roots of the plants formed from the seed form a fabric embedded in a compost which facilitates the detachment of the sod from a flat surface.

In U.S. Pat. No. 4,941,282, by Gene Milstein, entitled "Wildflower Sod Mat A Method of Propagation," the propagation of wildflower sod mats is described. The patent teaches a sod mat formed of sheets of porous synthetic material, a layer of planting medium and viable wildflower seeds which upon germination allows the root mass of the seeds to intermesh with the porous synthetic material thereby forming the sod mat. The patent teaches the planting medium composed of various materials such as a composition of 50% sphagnum moss, 49% vermiculite or perlite, and 1% nutritive material, capable of sustaining plant growth.

The present invention is directed to a soil-less sand based root zone medium for the production of turf grass sod which has good percolation rates, good bulk density and resists compaction and whose composition may be altered so as to be compatible with the existing root zone profile of the transplant site. The present invention also relates to a method for production of turf grass sod using the soil-less sand based root zone medium. Finally the invention is also directed to a sod mat produced by the method of the present invention which is suitable for use on sports surfaces including stadiums and golf courses. The present invention further relates to a method for production of a transportable turf using a porous foundation in connection with the soil-less sand based root zone medium or any other type of growing medium compatible with the porous foundation. The use of the porous foundation enables the transportable turf to be handled in increasingly larger widths and lengths. The present invention is particularly useful for sports field use. Transportable turf in tracts sufficiently large to cover a sports field are preferred in order to avoid the seams and other imperfections normally encountered with smaller tracts of turf or sod. The porous foundation of the present invention enables the transportable turf to be harvested in such large tracts.

SUMMARY OF THE INVENTION

It is an object of the invention to provide a soil-less, sand based root zone medium useful in the production of turf grasses in sod form and which is capable of being formulated so as to be compatible with the root zone soil profile of the site to which the sod will be transplanted and which has high consistent percolation rates and resists compaction, the root zone medium comprising:

(a) from about 60% by weight to about 100% by weight sand;

(b) from about 40% by weight to about 0% by weight organic amendment; and (c) an effective amount of fertilizer.

It is preferred that the grains of sand used in the present invention have a uniform size ranging from about 0.05 mm to about 1 mm.

It is also an object of the present invention to provide a sod mat comprising a mat of turf grass and a layer of soil-less sand based root zone medium produced by the method of the present invention.

It is a further object of the present invention to provide a transportable turf comprising a porous foundation.

It is a still further object of the present invention to provide a transportable turf for sports field use which comprises a porous foundation.

It is another object of the present invention to provide a transportable turf for sports field use which comprises a porous foundation and is designed to be handled in lengths and widths sufficient to cover a sports field with a single tract.

DETAILED DESCRIPTION OF THE INVENTION

Figure 1:
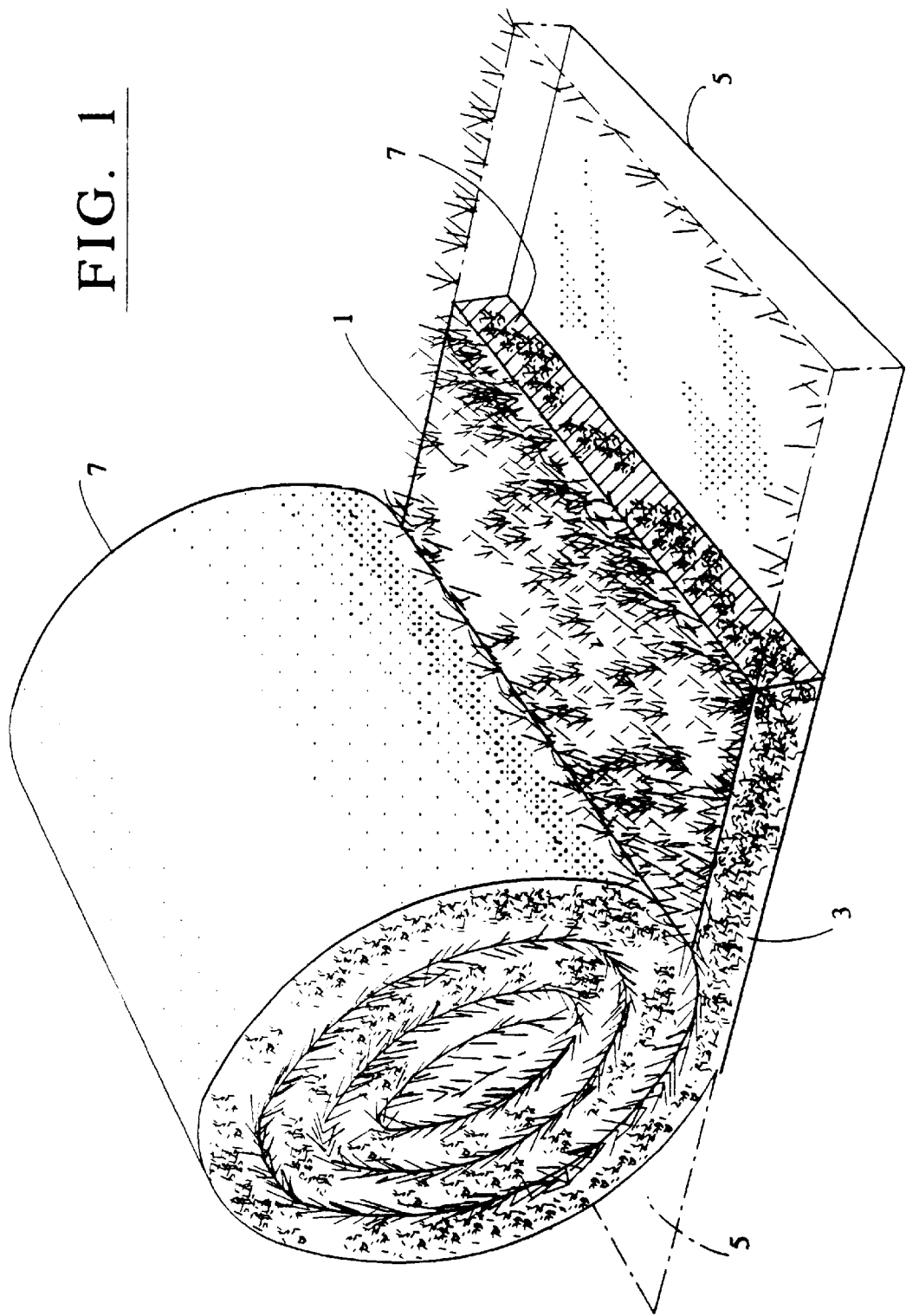
FIG. 1 illustrates a rolled sod mat including turf grass, root system, root zone medium and root impermeable layer.

The present invention relates to a soil-less sand based root zone medium useful in the production of sod and a method for the production of turf grass sod using the same soil-less sand based root zone medium. The present invention also relates to a sod mat comprising a mat of turf grass and a thin layer of the soil-less sand based root zone medium of the present invention (FIG. 1.). Sod produced by the method of the present invention is highly, resistant to compaction and meets USGA specifications for water infiltration rates (from 2 inches to about 10 inches per hour with an ideal rate of 4–6 inches per hour), bulk density (from about 1.2 gm/cc to about 1.6 gm/cc with an ideal bulk density from 1.25–1.45 gm/cc), porosity (total 40–55% with a non-capillary minimum of 15%) and water retention (12–25% by weight at a tension of 40 cm of water). Root zone media complying with these specifications promotes rapid growth of the turf grass and establishment of a dense root system.

The soil-less root zone medium of the present invention comprises from about 60% by weight to about 100% by weight sand from about 40% by weight to about 0% by weight organic amendment and an effective amount of nutrient material such as fertilizers (typically less than 1% by weight).

The sand utilized in the soil-less root zone mixture of the present invention should be of uniform size ranging from about 0.05 to about 1 mm in size so as to allow consistent percolation rates in accordance with USGA standards and to provide resistance to compaction. The size of the sand grains used in the present invention may be selected so as to be comparable in size and therefore compatible with the root zone profile of the site to which the sod will be transplanted.

The ability to select the appropriate sand size allows the user to customize the soil-less sand based root zone medium of the sod so as to be optimally compatible with the root zone profile of the transplant site. Soil-less sand based root zone medium containing this range of sand content and grain size minimizes layering problems which can arise when sod is laid on soil of the transplantation site.

The soil-less sand based root zone medium of the present invention also contains from about 40% by weight to about 0% by weight organic amendment. Organic amendments aid in the control of water percolation and infiltration rates, in retention of moisture, and may also provide nutritional value to the grass plants in the form of carbon, nitrogen phosphorus and minerals. Organic amendments useful in the present invention include but are not limited to, rice hull compost, milorganite, various peat mosses, fibrous plant material or fibrous vegetable matter.

The preferred organic amendment for use in the present invention is Canadian sphagnum peat moss. The preferred percentage of organic and amendment in the present invention is from about 30% by weight to about 20% by weight of the soil-less sand based root zone medium. However, it is also recognized that the percentage of organic amendment may vary depending on the root zone composition on which the sod will be transplanted, and the specific uses of the turf being grown (e.g., golf course fairway, greens surfaces or other surfaces).

The composition of the present invention may also contain effective amounts (typically less than 1% by weight) of fertilizer to stimulate and enhance the growth of grass. These fertilizers may be selected from a wide variety of fertilizers including slow release fertilizers, lime fertilizers and others. A preferred nutrient for the composition of the present invention has a ratio 1:1:1 of nitrogen:phosphorous:potassium when used with stolons or plugs and 0:1:1 nitrogen:phosphorous:potassium when used with seed. The criteria for selection of fertilizers for growth of various types of turf grass sod are well known in the art.

A preferred composition of soil-less sand based root zone medium of the present invention includes about 20% by weight organic amendment and about 80% by weight sand and up to about 1% nutrient. However, root zone medium composition may be varied in accordance with the present invention in order to be more compatible with the root zone profile of the site to which the sod will be transplanted or to meet performance standards required by the specific use of the sod.

The root zone composition of the present invention is useful for growing a wide variety of turf grasses 1 (FIG. 1) beginning from seed, sprigs or plugs. The particular grass selected for growth in the composition of the present invention will depend on the ultimate use of the surface whether it be for use in a stadium, golf course or other use the climate in which it will be used, and other environmental factors.

Another object of the present invention is a method for cultivating, developing and growing all varieties of turf grasses in sod for using the soil-less sand based root zone medium of the present invention. The method of the present invention comprises the selection of the appropriate amount of sand, the appropriate size sand grain so as to be compatible with the root zone profile of the area to which the sod will be transplanted, the selection of an organic amendment, the selection of fertilizer if desired and the selection of turf grass type to meet the specific needs of the end user. These selections will depend on the nature of the root zone on which the sod will be transplanted, the available nutrients, climatic conditions under which the sod will be grown, the percolation rates and water retention characteristics desired and the use to which the sod will be put.

By way of example, in order to produce the soil-less sand based root zone medium of the present invention 3 (FIG. 1), the appropriate amount of sand of the appropriate size, and organic amendments are mixed using general practices in wide spread use in the sod industry. Typically, ingredients can be mixed in a soil blender such as a "Greensmix"® Soil Blender (Waupaca, Wis.). Fertilizers and seeds may also be added at this stage and blended with sand and organic amendment if so desired. Seed is typically added at a rate of 45 lbs/acre. Typical fertilizer for sod growth is 0:1:1 when starting from seed. Upon thorough mixing, the composition is metered out (deposited) to the appropriate depth of from about 0.01 inches to about 6.0 or more inches on a root impermeable layer 5 (FIG. 1). Alternatively, the depth may range from about 0.25 inches to about 1.5 inches. Metering may be accomplished using machinery such as that described in U.S. Pat. No. 4,232,481, entitled "Carpet of Vegetable Matter," by Michel C. Chamoulaud, which is incorporated herein by reference, or other types of machinery well known in the art. The root impermeable layer 5 may be made of synthetic material such as plastic including polyethylene, rubber, porous polyethylene, other plastics, filter cloth, non-woven materials such as Agryl P-30 or P-50, (Agrifabrics, Atlanta, Ga.) or other root impermeable materials. The root impermeable layer may be perforated to allow drainage of excess moisture. If perforations are used, they must be small enough to prevent roots from penetrating the layer. Upon laying down of the soil-less sand based root zone medium onto the root impermeable layer, seed (if not yet added), stolons, sprigs or plugs are then planted in the medium using standard procedures well known in the sod industry. For example, stolons are typically planted at a rate of 600 bushels per acre. The choice of seed, stolon, sprig or plug will be determined by the type of turf grass desired. By way of non-limiting example, grasses which may be started from stolons, sprigs or plugs include various Bermuda grasses, such as Tifway, Tifway II, Tifgreen, Tifdwarf, Zoysia grasses such as Myers Z-52, Casmere, and grasses such as St. Augustine, and Centipede. By way of non-limiting example, grasses grown from seed include bent grass such as Penncross, Pennlinks, SR1020 and others. Other grasses grown from seed include Fescues, Ryes, Bluegrasses, Zoysias, Buffalo grasses and others. The quantity of plant material used is based on normal sod establishment procedures which are well known in the art. For example, when bent grass sod is desired, seed is usually evenly spread at a rate of about 50 lbs. per acre. Turf grass is then allowed to grow using standard cultivation procedures which are well known in the art and which include adequate watering and supplemental fertilization if required or desired. Choice of fertilizer will depend on the type of grass used and on other criteria which are well known in the art. Examples of fertilizers useful in the present invention include but are not limited to fertilizers having nitrogen: phosphorous:potassium ratios of 1:0:0, 1:1:1, 2:1:2 and 2:1:3. After planting, the sod mat 7 (FIG. 1) is typically ready for harvest within 10–14 weeks. An important advantage of the method of the present invention is that due to the presence of the root impermeable barrier 5 the root system 3 (FIG. 1) of the sod grows in a horizontal direction and does not require horizontal cutting during harvesting as does conventional sod. The only cutting necessary for harvest is along the edges of the sod to allow the sod to be cut to appropriate size and rolled for transport. Because of the minimal disturbance to the root system, shock is minimized and root zones are established more quickly at the site of use. Sod produced by this method is resistant to compaction, compatible with the root zone profile of the site to which it will be transplanted, has appropriate percolation rates and water retention properties and is well suited for use on sports surfaces including stadium and golf courses.

Figure 2:
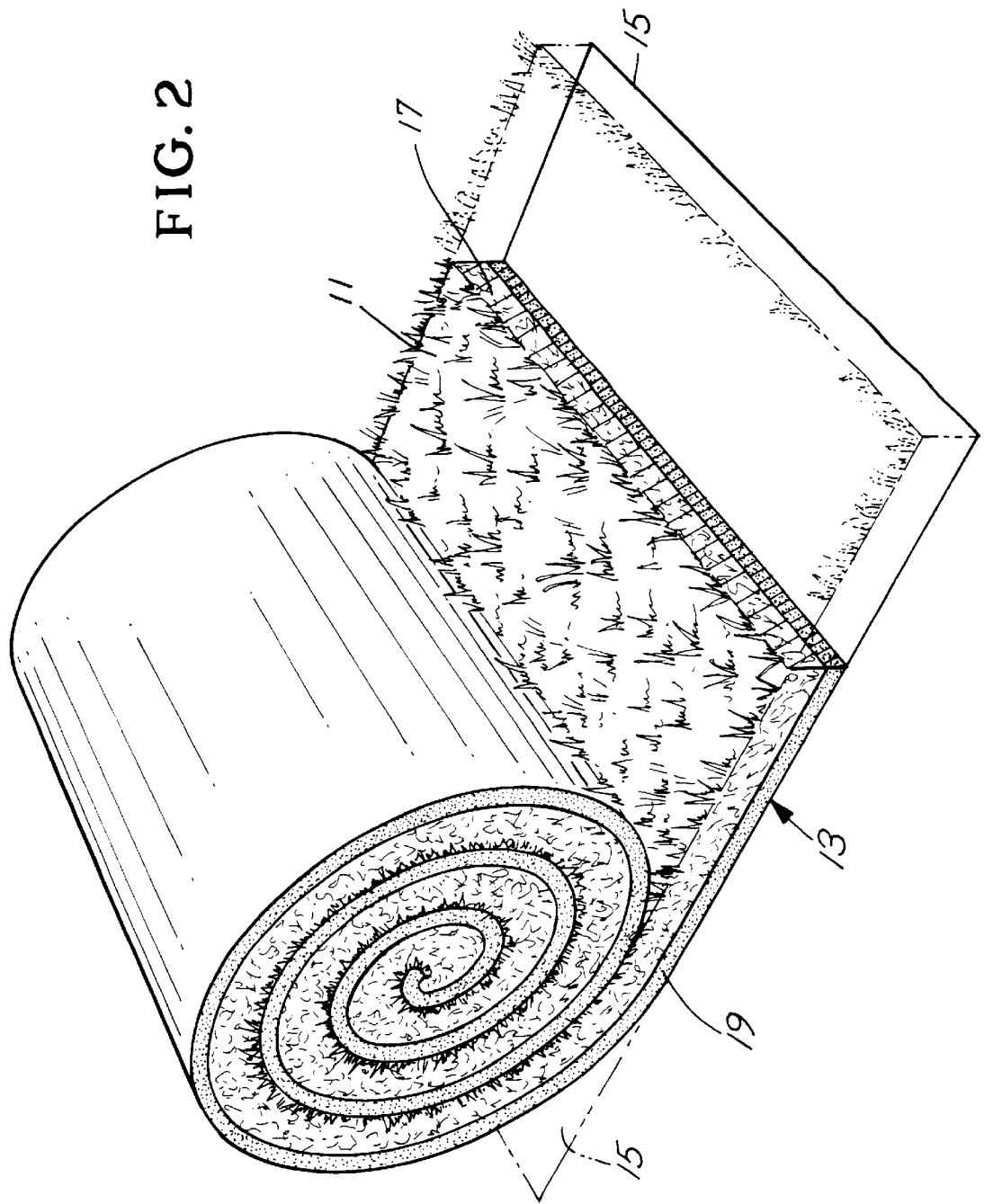
FIG. 2 illustrates a roll of transportable turf including turf grass, root system, root zone medium, porous foundation, and root impermeable layer.

Referring now to FIG. 2 a roll of transportable turf 13 can be prepared as generally described above for the root zone medium 3 of FIG. 1. That is, a root impermeable layer 15 may be utilized to prevent the roots of the turf grass from extending below the layer 15 (as described above in connection with layer 5 of FIG. 1). The porous foundation 19 may be placed upon the root impermeable layer 15 such that the foundation 19 completely covers the root impermeable layer 15 leaving no spaces between the different segments of the porous foundation 19. Suitable porous foundations include plastic screens, burlap-type material, shade cloth (such as is used in greenhouses to permit limited sunlight), Enkmat material (available from Enkmat, Inc.) and geotextiles and various combinations thereof. Preferred porous foundations 19 are geotextiles which are available from a number of manufacturers including Polyfelt, Inc. of Atlanta, Ga. and ReMay, Inc. commercially-available geotextiles vary in weight, thickness, tensile strength, water flow rates, width, length, and various other properties. The thicker geotextiles are preferred because they provide added durability to the final transportable turf 13. This added durability and strength imparted to the transportable turf 13 is especially important where very large tracks (e.g., sports field sized) are to be transported from one site to another.

Additionally, the porous foundation 19 may be biodegradable or non-biodegradable. A biodegradable porous foundation may be used where the site to which the transportable turf 13 will be transferred does not require the porous foundation for added support or subsequent removal or transfer of the turf after the original transfer. Generally, such biodegradable porous foundations may be utilized for outdoor uses where the transportable turf 13 is intended to grow into the site and provide the permanent turf surface at the site.

A non-biodegradable porous foundation can alternatively be used where the site to which the transportable turf 13 will be transferred cannot provide the turf 13 with the permanent support required by the turf 13. In this case, the non-biodegradable porous foundation may be used as the necessary support. Non-biodegradable porous foundations are also useful for applications where the turf 13 is not intended as a permanent site surface. The non-biodegradable porous foundation enables future transfers from site to site.

Finally, the appropriate amount of sand of the appropriate size and organic amendments may be spread over the porous foundation as set forth above in the preparation of sod mat 7 of FIG. 1 of course, any other growing medium compatible with the end use and the particular porous foundation 19 may be used. The resulting sod mat 17 of FIG. 2 can be made of varying thicknesses to conform to the desired end use. Thicknesses from fractions of an inch to 2–3 inches can be accomplished with the present invention. For example, where cleated shoes are worn, such as in football and soccer, the geotextile 19 is preferably approximately 1½ inches from the surface of the grass. Therefore, a depth of sand and sand mixed with amendments must be added on top of the geotextile 19 to result in a sod mat 17 which would yield a grass surface of 1½ inches above the geotextile. Of course, the thickness of the sod mat can be varied with increased or decreased depth of sand or sand mixed with amendments for other various uses. Additionally, where the porous foundation 19 itself includes the necessary amendments to support the growing turf, the grass seed may be applied directly to the porous foundation. In this event, the porous foundation 19 and the growing medium are combined to support the growing grass.

Turf grass is then allowed to grow using standard cultivation procedures as discussed above in connection with the root zone medium 3 of FIG. 1. The transportable turf 13 is typically ready for harvest within 10 to 14 weeks. An important advantage of the method of the present invention and the resulting transportable turf is that due to the presence of the root impermeable barrier 15, the root system of the sod mat 17 grows in a horizontal direction and does not require horizontal cutting during harvesting as does conventional sod. The only cutting necessary for harvest is along the edges of the transportable turf 13 to allow the transportable turf 13 to be cut to appropriate size and rolled for transport.

The main purpose of the porous foundation 19 is to provide a medium into which the root system of the sod mat 17 may extend and intertwine. Accordingly, although the porous foundation 19 may be available in relatively narrow widths (e.g., 10 to 15 feet) the resulting transportable turf 13 will not be limited to those relatively narrow widths because the root system of the sod mat 17 will in effect lace adjoining sections of,the porous foundation 19 such that during harvest, the transportable turf can be cut, rolled, and transported in widths substantially larger than the initial width of the porous foundation 19. The only size limitation is the length and width that can logistically be handled. It is, contemplated that widths of 40 to 45 feet, which is the standard length of a semi-truck flatbed, can be obtained by the method and transportable turf 13 of the present invention.

In laying the porous foundation 19 upon the root impermeable layer 15, the porous foundation 19 may be laid such that adjoining strips do not overlap but merely abut each other in practice, minor gaps or overlaps of the porous foundation 19 may be encountered. Such minor deviations do not present a problem because the root system of the sod mat will compensate for such minor deviations. In any event, the root system of the sod mat 17 will attach to the porous foundation 19 and penetrate downward toward the root impermeable layer 15 at which point it will only grow horizontally as discussed above. The horizontal growth of the root system of the sod mat 17 increases the tensile strength of the transportable turf 13.

Because the transportable turf 13 provides a stable grass surface, the transportable turf 13 may not only be used as the sod mat 7 of FIG. 1 in outdoor applications, but may also be, used in indoor applications such as indoor sports arenas. In this regard, it is of course not necessary to match the root zone profile of the sod mat 17 to that of the site to which the turf 13 will be transplanted. However, such indoor use involves the additional consideration of proper drainage of excess water which considerations have already been addressed in the art.

I claim:

1. A transportable turf grass comprising
   (a) a grass sod mat that is highly resistant to compaction, said grass sod mat having a root system and a soil-less sand based root zone medium; and
   (b) a porous foundation, wherein said porous foundation is a geotextile; said root system of said sod mat extending through said root zone medium into said porous foundation and intertwining therewithin, whereby said transportable turf grass is formed in a stabilized condition.

2. The transportable turf of claim 1 wherein said sod mat is of a predetermined size; and wherein said porous foundation is formed of a plurality of substantially laterally disposed separate strips, said root system intertwining to bind said strips together.

3. The transportable turf of claim 1 wherein said turf comprises at least one tract having a width of about 40 to 45 feet.

4. The transportable turf of claim 1 wherein said turf comprises at least one tract which is at least about 3 times as wide as the width of the porous foundation.

5. The transportable turf of claim 1 wherein said turf is in a length and width sufficient to cover a sports field with a single tract.

6. A grass sports surface comprising
   (a) a grass sod mat, said grass sod mat comprising a root system and a soil-less sand based root zone medium, wherein the sod mat is highly resistant to compaction, and
   (b) one or more sheets of a porous foundation; said root system of said sod mat extending through said root zone medium into said porous foundation and intertwining therewithin, whereby said sports surface is formed in a stabilized condition.

7. The grass sports surface of claim 6 wherein said sod mat is of a predetermined size; and wherein said porous foundation is formed of a plurality of substantially laterally disposed separate strips, said root system intertwining to bind said strips together.

8. The grass sports surface of claim 6 wherein said porous foundation is a geotextile.

9. The grass sports surface of claim 6 wherein the soil-less sand based root zone medium comprises:
   (1) from about 60% by weight to about 100% by weight sand;
   (2) from about 40% by weight to about 0% by weight organic amendment; and
   (3) an effective amount of fertilizer.

10. The grass sports surface of claim 9 wherein the organic amendment is Canadian sphagnum peat moss.

11. The grass sports surface of claim 6 wherein the sod mat has a thickness of at least approximately 1½ inches.

12. The grass sports surface of claim 6 wherein said sports surface is a single tract.

13. The grass sports surface of claim 6 wherein said porous foundation is biodegradable.

14. The grass sports surface of claim 6 wherein said porous foundation is not biodegradable.

15. A method of cultivating, developing and growing a transportable turf grass comprising a grass sod mat the method comprising the steps of:
   (a) laying down a root impermeable barrier;
   (b) laying down a porous foundation on the root impermeable barrier;
   (c) depositing a soil-less sand based root zone material on the porous foundation, wherein the soil-less sand based root zone material comprises:
      (1) from about 60% by weight to about 100% by weight sand;
      (2) from about 40% by weight to about 0% by weight organic amendment selected from the group consisting of peats, processed sludge, rice hulls, fibrous plant materials, or organic polymers; and (3) an effective amount of fertilizer;

(d) introducing grass seeds, stolons, sprigs, or plugs into the root zone medium; and (e) propagating the grass seeds, stolons, sprigs, or plugs into a harvestable mat that is highly resistant to compaction, said harvestable mat comprising grass plants, root zone medium, roots and porous foundation.

16. The method of claim 15 wherein the organic amendment is Canadian sphagnum peat moss.

17. The method of claim 15 wherein the porous foundation is a geotextile.

18. The method of claim 15 wherein the porous foundation comprises amendments for growing turf.

19. The method of claim 15 wherein the porous foundation and the soil-less sand based root zone material are combined.

20. The method of claim 15 wherein said porous foundation is biodegradable.

21. The method of claim 15 wherein said porous foundation is not biodegradable.

22. A transportable turf grass comprising (a) a grass sod mat that is highly resistant to compaction, said grass sod mat having a root system and a soil-less sand based root zone medium;

wherein the soil-less sand based root zone medium comprises:

from about 60% by weight to about 100% by weight sand;

from about 40% by weight to about 0% by weight organic amendment; and an effective amount of fertilizer; and (b) a porous foundation; said root system of said sod mat extending through said root zone medium into said porous foundation and intertwining therewithin, whereby said transportable turf grass is formed in a stabilized condition.

23. The transportable turf of claim 22 wherein said porous foundation is biodegradable.

24. The transportable turf of claim 22 wherein said porous foundation is not biodegradable.

* * * * *